July 11, 1939.  D. R. MARTIN  2,165,868

FERTILIZING NOZZLE

Filed March 23, 1935

INVENTOR
Dorr Martin.
BY

ATTORNEY

Patented July 11, 1939

2,165,868

UNITED STATES PATENT OFFICE 2,165,868

FERTILIZING NOZZLE

Dorr R. Martin, Detroit, Mich.

Application March 23, 1935, Serial No. 12,550

4 Claims. (Cl. 299—84)

This invention relates to fertilizing nozzles and is for the purpose of providing an improved means for utilizing the modern highly concentrated chemicals, such as fertilizers, insecticides, prophylactics and soil additives dissolved in a stream of water and particularly to a device for impregnating a confined stream of water with these chemicals when supplied in the form of pre-formed compressed tablets and finally distributing the solution through a nozzle designed for use with an ordinary garden hose.

One object of this invention is to provide an improved device by means of which highly concentrated soluble chemicals, which are recognized as essential plant nutrients and which are required in relatively large amounts for satisfactory plant growth, may be dissolved in a confined stream of water from a garden hose and fed as desired.

Another object of this invention is to provide a device by means of which highly concentrated soluble chemicals, which are becoming recognized as prophylactic plant stimulants and which are toxic to plant life in any except extremely mild doses, may be administered as a safely applicable solution in a stream of water from a garden hose.

Another object of this invention is to provide a device by means of which these chemicals may be readily applied to plants in the form of a solution in a stream of water, which is the preferred form in which plants assimilate such elements.

The principal object of this invention is to provide a device by means of which several soluble chemicals may be simultaneously dissolved in a confined stream of water to form a homogeneous solution containing the desired concentration of each of the several elements, since it is recognized that the most efficient way to apply the essential nutrients and the desired prophylactic stimulants to plants is in complete combination because in this manner only can the recognized antagonism of certain elements for certain other elements reduce their toxicity to a point permitting stimulating dosages without harmful effects.

The soluble chemical elements indispensable to normal healthy plant development, for which this device is intended are prepared for use in the device by granulating together all these elements in the desired proportions by a well known process, and then forming measured portions of these granules into uniform homogeneous compressed tablets, by a well known process, and of a size and shape to restrictively fit into the device. The amount of pressure applied to cause the granules to adhere into uniform tablets determines their hardness, their rate of solubility, and hence the overall concentration when dissolved in the water stream, since the device delivers a fixed quantity of water in a given time with constant settings of the valves therein.

A characteristic of the inter-relationship of the tablets in the device is that the solvent water is restricted to contact relatively the same area of each tablet because of the restricted location of the tablets in the device and also only the bottom surface of the tablets by merely flushing gently across them and hence exerting a uniform solvent action without tending to dislodge any particular granules of the tablets before they are completely dissolved, which prevents temporary over dosages of the toxic elements.

The herein illustrated and described structure provides an exemplary means for obtaining the foregoing objects of this invention and other objects, novel principles, safety features and advantageous results will be apparent from the following specification and accompanying drawing wherein—

Figure 1:
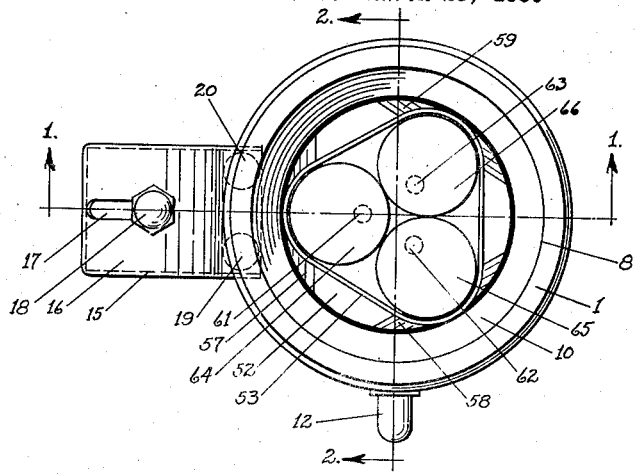
Fig. 1 is a plan view of a device embodying the invention, as it appears after removing the glass container.

In a preferred form, the device consists of a body 1, having in the bottom part a threaded recess 2, arranged for connection to a source of water supply, such as a garden hose. Such hose and the circular boss 3, surrounding the recess 2, when interconnected for use, form a handle whereby the device may be supported in one's hand, the fingers encircling said hose and boss and with the thumb in operative position with reference to the button end 4 of the piston valve 5.

The clear glass container 6 is detachably associated with the upper part of the body 1 by means of the screw threaded portion 7 engaging the threaded recess 8 of the body. The bottom edge of the threaded portion 7 seats against a gasket 9, which is thereby forced to seat against the surface 10 of the body, thus forming a fluid tight joint. In the side of the body is a mixing-delivery tube 11, press fitted or otherwise suitably mounted therein, for the purpose of delivering and directing the fluids leaving the device.

In the side of the body and at right angles to the mixing-delivery tube, is positioned a needle valve 12 with its end 13 bent to form a handle. Valve 12 is adjustable by means of the screw threaded portion 22 engaging the threaded valve chamber in said body. Surrounding the stem of said valve is a packing gland 23, compressed between the washer 24 and the packing nut 25. Surrounding the valve is an annular space 26 in said body. Passing through the stem of said valve is a retention pin 27, the ends of which extend into the annular space 26. The pointed end of valve 12 seats against the annular constriction 29 which separates the threaded valve chamber from the passage 30. Connecting the threaded valve chamber with the recess 2 is a port 30a, for conducting fluid from the associated source into said valve chamber. The valve 12 controls all fluid entering the device. Communicating with passage 30 is an injector duct 31, which may be formed by drilling a passage in said body. This injector duct 31 is coaxially located with the mixing-delivery tube 11 and is separated therefrom by the annular space 32.

The annular space 32 is in direct communication with the chamber 33, formed between the recessed portion 34 of the body and the inside of the glass container 6. Annular space 32 is the lowermost portion of chamber 33, hence any liquids in said chamber will gravitate thereinto. Since this device is a fertilizing nozzle, since fertilizers are applied to the ground and since the axis of the mixing-delivery tube is horizontal; in use the device would never be called upon to assume a position in which the annular space 32 was not the lowermost portion of chamber 33.

The inner end of the mixing-delivery tube 11 is tapered as shown at 35 and the internal diameter of said tube is slightly greater than the diameter of injector duct 31. These conditions in connection with the coaxial location of said bores, separated by the space 32, are for the purpose of creating an injector action, that is, for the purpose of creating an area of reduced pressure or partial vacuum in and surrounding said annular space 32. Thus the fluid discharging from the injector duct 31 into mixing-delivery tube 11 vacuates the fluid contents of annular space 32 into mixing-delivery tube 11 where it is mixed and entrained with the fluid coming from injector duct 31, and the mixture is discharged from the orifice 14 along the axis of said mixing-delivery tube 11.

The backward continuation of injector duct 31 beyond passage 30 is passage 36, connecting with passage 37 which discharges upward past piston valve 5 into annular space 38. Passage 39 furnishes communication from passage 30 into valve barrel 40 and thence through the partially closed end 41 of barrel 40 into the recessed portion 34 of chamber 33.

Passage 39 and passage 37 are of the same cross sectional area and materially less than the area of injector duct 31. The ratio of cross sectional area of passage 37, as compared to that of injector duct 31, determines the maximum percentage of total fluid which may be used to dissolve the chemicals and hence is a controlling factor in determining the overall concentration of the delivered solution.

The piston valve 5 is slidably mounted in piston barrel 40. Passing through said valve is the retention pin 42, the ends of which extend into the annular space 43, and this pin acts to restrict the outward movement of said valve by contact with plate 44, which may be screw secured to the body. Acting to maintain piston valve 5 at the outward end of its movement is the coiled spring 45 within barrel 40 and constricted between the end of the valve 5 and the tubular member 46, which only partially closes the barrel 40, as shown at 41. The button end 4 of valve 5 extends out through plate 44, the hole in said plate leaving an annular opening 47 around said valve. The annular space 48 around valve 5 in body 1 is an enlargement of the barrel 40. Connecting said annular space 48 with the recessed portion 34 of body 1 is passage 49. Hence the chamber 33 within the glass container is in open communication with the atmosphere. Since chamber 33 is in direct communication with annular space 32 by means of the recessed portion 34 of the body; it follows that the entire chamber within the glass container 6, as well as the connected series of passages and annular spaces, 49, 48, 42 and 47, is subject to the vacuating action which is induced in annular space 32.

The inner end of piston valve 5 normally just allows the full area of passage 39 to be communicated to valve barrel 40, when in its normal spring retained position. In this normal position of valve 5, the annular groove 50 in the periphery of said valve just closes passage 37.

Figure 2:
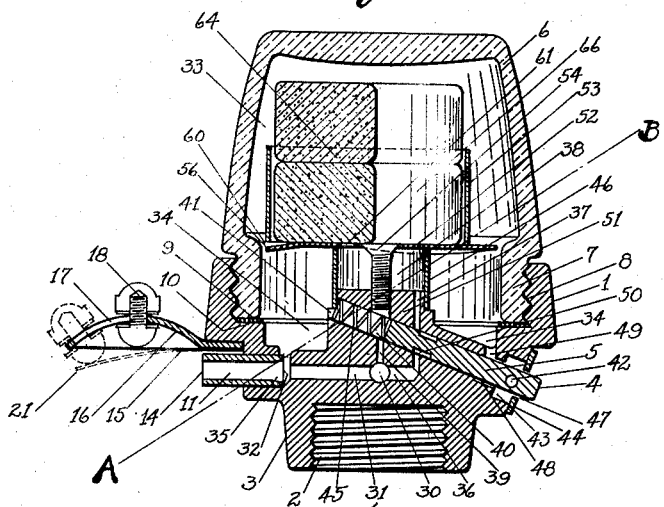
Fig. 2 is a vertical section of the device on line 1—1.
Figure 3:
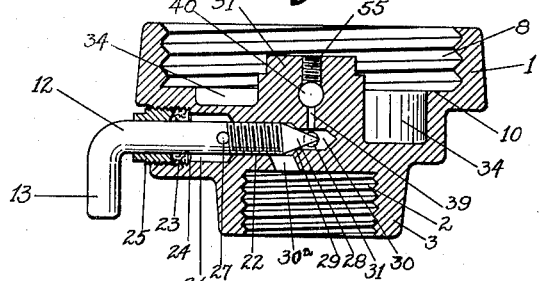
Fig. 3 is a vertical section on line 2—2 of Fig. 1, as it appears after the removal of the glass container and the tablet holder.

When valve 5 is moved against the pressure of spring 45 to its opposite maximum position from that shown in Fig. 2, by pressure of the thumb against the button end 4; passage 39 is just completely closed by the inner end of said valve and passage 37 is just completely opened by means of annular groove 50. Thus any intermediate position of valve 5 will allow of a total flow of fluid equal to the capacity of one passage of the size of the equal area passages 37 and 39 to pass from passage 30 into chamber 33.

Within the chamber 33 and extending upward from the bottom of the recessed portion 34 of the body 1 is the boss 51, being a part of the body and adapted to receive thereon the tubular member 46. Mounted concentrically on the top end of tubular member 46 is the circular plate member 52, being attached thereto by means such as soldering. Mounted concentrically on top of the plate member 52 is the triangular tubular member 53, being attached thereto by means such as soldering. The tubular member 46, plate member 52 and triangular tubular member 53 together form a tablet holder, which is secured to boss 51 by means of screw 54.

At the three equi-distant points in plan of the plate member 52, at the maximum radius of triangular tubular member 53, the plate member is bent downward as indicated in section at 56, Fig. 2, and in plan at 57, 58 and 59, Fig. 1, thus leaving an opening at these three equi-distant points, between the top of plate member 52 and the bottom of the triangular tubular member 53, one of which is shown in section at 60, Fig. 2. Located in the plate member 52, equi-distant and on the maximum radii of the triangular tubular member 53, are the three holes 61, 62 and 63, leading from the annular space 46 above the boss 51 up into the cup area above plate member 52 and within the triangular tubular 53. These three holes 61, 62 and 63 continue the communication from passage 37 through annular space 38 up into the cup space of the tablet holder above plate member 52, and the total combined area of the said three holes is materially greater than the area of passage 37, for the purpose of reducing the rate of flow of the fluid leaving said holes to a point where the tablets will not be torn apart or forced from restricted position.

Restrictively positioned within the triangular shaped cup space bounded by member 53, above plate 52 and resting on said plate, is a group of three tablets 64, 65 and 66, each positioned relatively alike over one of the holes 61, 62 and 63. These tablets are prepared for use in this device by compressing the dry granular form of various chemicals, by means of a well known process, into uniform homogeneous tablets of a form and size that can be restrictively positioned in said cup space, and of a hardness to prevent the individual granules sluffing off before dissolved to possibly clog a passage in the device.

The vacuating capacity created by the flow of water from injector duct 31 into mixing-delivery tube 11 is considerably greater than the capacity of passage 39 and maintains this excess capacity for all possible openings of valve 12, hence not only is all the water entering recessed portion 34 by way of passage 39, vacuated therefrom immediately, but the excess vacuating capacity also draws air from the atmosphere into chamber 33 and causes same to circulate about the tablet holder, by way of connected passages and annular spaces, 47, 43, 48 and 49. The purpose of this excess vacuating capacity in chamber 33, over any possible capacity for water entering said chamber, is to insure that any chemically impregnated solution gravitating to the bottom of said chamber will be immediately and completely vacuated therefrom, thus assuring that the fluid will never produce a soaking action on the chemicals.

The purpose of providing an opening from the atmosphere into chamber 33, through which there is a constant inflow of air during all operating conditions of said device, is—firstly, to provide means for pressure of the atmosphere to be transmitted to chamber 33 and to thus assist the vacuating action of the fluid discharging from the injector duct 31 into the mixing-delivery tube 11, to remove the fluid contents from the annular space 32, which is the lowermost point of chamber 33.

Secondly, to provide an air vent into chamber 33 to permit a more positive, rapid and complete vacuating action on the fluid contents of chamber 33 by the vacuating means above mentioned and explained.

Thirdly, to permit said vacuating means at all times to maintain any accumulated fluid level, in the lower part of chamber 33, well below the lowest point of the tablets, for the particular purpose of preventing any soaking action of such fluids on said tablets. And lastly, to provide a circulation of air in the chamber 33 so that vapor will not collect on the inner surface of the glass container 6, as any such collection of vapor would tend to prevent ready visibility of the contents of said chamber.

The water emerging from the holes 61, 62 and 63 impinges gently against the bottoms of the tablets which are restrictively placed over said holes, and they are gradually dissolved and the chemically impregnated water thus formed flows along the top of plate 52, under and around the bottoms of said tablets, to and through some one or all of the openings similar to opening 60. This concentrated impregnated fluid falls by gravity into the recessed portion 34 of the body and finds its way to the annular space 32, from where it is vacuated into the mixing-delivery tube 11.

Here it is thoroughly mixed and entrained with the water coming from the injector duct 31 and thus becomes highly diluted and passes out through the orifice 14 to be directed as desired.

The combined capacity of the three openings similar to the opening 60 is considerably greater than the combined capacity of the three holes 61, 62 and 63, for the purpose of preventing water accumulating above the plate 52 and around the tablets.

The fluid contacts only the bottoms of the tablets in the holder, hence dissolution takes place from the bottom only, and as they dissolve away they drop down in the holder. Hence the rate of dissolution may be watched by the user, through the clear glass container 6 and he may control such rate by manipulation of the piston valve 5.

A safety feature of the device is secured by virtue of the fact that no "slug" of highly concentrated impregnated fluid can collect in the recessed portion 34 of the body, to be ejected upon some plant, because even though there may be a dripping of such fluid from the plate member 52, after piston valve 5 has closed passage 37; the continual hereinbefore explained vacuating action withdraws any such fluid at once from the chamber.

Thus it is seen that my improved device affords an effective means for making a mixture of a fluid stream with chemicals, from preformed compressed tablets, such as may be readily and safely distributed through a nozzle which may be associated with an ordinary garden hose.

While I have disclosed and described my invention by means of an illustrative device, I do not limit myself to any one or more details of structure, but may employ such changes and modifications of structure as occasion may require without departing from the spirit of the invention as expressed in the appended claims.

Having thus disclosed my invention in connection with one form of structure by which these objects may be obtained, what I claim is:

1. The combination with a nozzle, of a chambered element including a base supported thereon, a container within the chamber of the said element for supporting a water soluble material above the bottom of the chamber, the base having a main valve controlled water passageway for discharging water through the nozzle, and auxiliary valve controlled passageway opening to the bottom of the container for discharging water to contact with the water soluble material to produce a solution, the container having an opening on one side adjacent the bottom for discharge of solution therefrom to the bottom of the chamber, and said main valve controlled passageway having an opening constantly in communication with the chamber whereby a flow of water through the nozzle causes the solution in the chamber to entrain with the water flowing through the nozzle.

2. In a fertilizing nozzle, the combination therewith of a chambered element supported thereby, a container for fertilizing material positioned in the chamber with its bottom above the bottom of the chamber, a main valve controlled passageway for supplying water to the nozzle and a secondary passageway opening through the bottom of the container, the container having an opening through which solution provided by water flowing thereinto may discharge to the chamber, and said main valve controlled passageway having an opening constantly in communication with the chamber whereby the solution in the chamber is entrained with the water passage through the nozzle.

3. In a device of the character described, a chambered element having a base attachable to a source of water supply and having a main passageway including a nozzle for discharge of liquid, a secondary passageway opening at one end to the main passageway, a tablet container in the chamber having three apertures in its bottom forming the other end of the secondary passageway, said container being constructed to support tablets in three stacks and being of the general form of an equi-lateral triangle, the apices of which are formed on a radius substantially that of the tablets to be contained therein, the apertures for the secondary passageway being so located as to be covered by the bottom tablet of each of the three stacks, said container further having an aperture for discharging solution to the chamber, the bottom of the chamber having an opening to the main conduit whereby solution in the chamber may be entrained with the water passing to the nozzle.

4. In a device of the character described, a chambered element having a base adapted for connection with a water supply conduit, a nozzle, a main passageway between the nozzle and the supply conduit, a container positioned in the chamber of the said chambered element having its bottom above the bottom of the chamber, a secondary conduit opening to the main conduit and having a terminal end within the chamber, the base of the container being mounted on the said terminal end and having apertures opening into the bottom of the container, the container further having an aperture for discharge of solution to the bottom of the chamber, and means whereby the solution in the chamber is entrained with the liquid passing through the nozzle.

DORR R. MARTIN.